(12) United States Patent
Le Bars

(10) Patent No.: US 7,878,554 B2
(45) Date of Patent: Feb. 1, 2011

(54) NON-AGGRESSIVE ANCHOR WASHER

(75) Inventor: Nicolas Le Bars, Thorigne (FR)

(73) Assignee: Legris SA, Rennes (FR)

( * ) Notice: Subject to any disclaimer, the term of this patent is extended or adjusted under 35 U.S.C. 154(b) by 498 days.

(21) Appl. No.: 11/584,625

(22) Filed: Oct. 23, 2006

(65) Prior Publication Data
US 2007/0092852 A1   Apr. 26, 2007

(30) Foreign Application Priority Data
Oct. 26, 2005   (FR) .................................. 05 10927

(51) Int. Cl.
*F16L 19/06*   (2006.01)

(52) U.S. Cl. ...................... 285/340; 285/319; 285/321; 285/323; 285/345

(58) Field of Classification Search ................. 285/201, 285/319, 321, 323, 340, 345; 403/367, 371, 403/372; 411/516, 520, 521
See application file for complete search history.

(56) References Cited

U.S. PATENT DOCUMENTS

| | | | | |
|---|---|---|---|---|
| 3,464,308 A | * | 9/1969 | Dohmeier | 411/437 |
| 4,139,038 A | * | 2/1979 | Haussermann | 411/247 |
| 4,266,576 A | * | 5/1981 | Bradford | 138/40 |
| 5,401,379 A | * | 3/1995 | Mazzochi | 205/99 |
| 6,447,019 B1 | * | 9/2002 | Hosono et al. | 285/148.19 |
| 2001/0045748 A1 | * | 11/2001 | Muto | 285/308 |
| 2003/0122372 A1 | * | 7/2003 | Muto | 285/39 |
| 2006/0170212 A1 | * | 8/2006 | Le Bars | 285/308 |

FOREIGN PATENT DOCUMENTS

| | | | |
|---|---|---|---|
| FR | 2 810 087 | | 12/2001 |
| GB | 2083130 A | * | 3/1982 |
| GB | 2 294 990 | | 5/1996 |
| WO | WO 2004/015325 | | 2/2004 |

\* cited by examiner

*Primary Examiner*—James M Hewitt
*Assistant Examiner*—Jay R Ripley
(74) *Attorney, Agent, or Firm*—Young & Thompson

(57) ABSTRACT

An anchor washer for anchoring a first element and a second element in relative engagement, includes an annular portion from which there extends at least one tooth that is inclined relative to a central axis of the annular portion, the annular portion being designed for mounting on the first element, and the tooth having two side faces between which there extends a rubbing surface for being oriented substantially towards the second element, the surface being connected to the side faces via coupling portions, the tooth being shaped so that at least one of the coupling portions is set back from at least a portion of the surface so that the coupling portion is kept at a distance from the second element. A coupling device including such a washer is also disclosed.

4 Claims, 3 Drawing Sheets

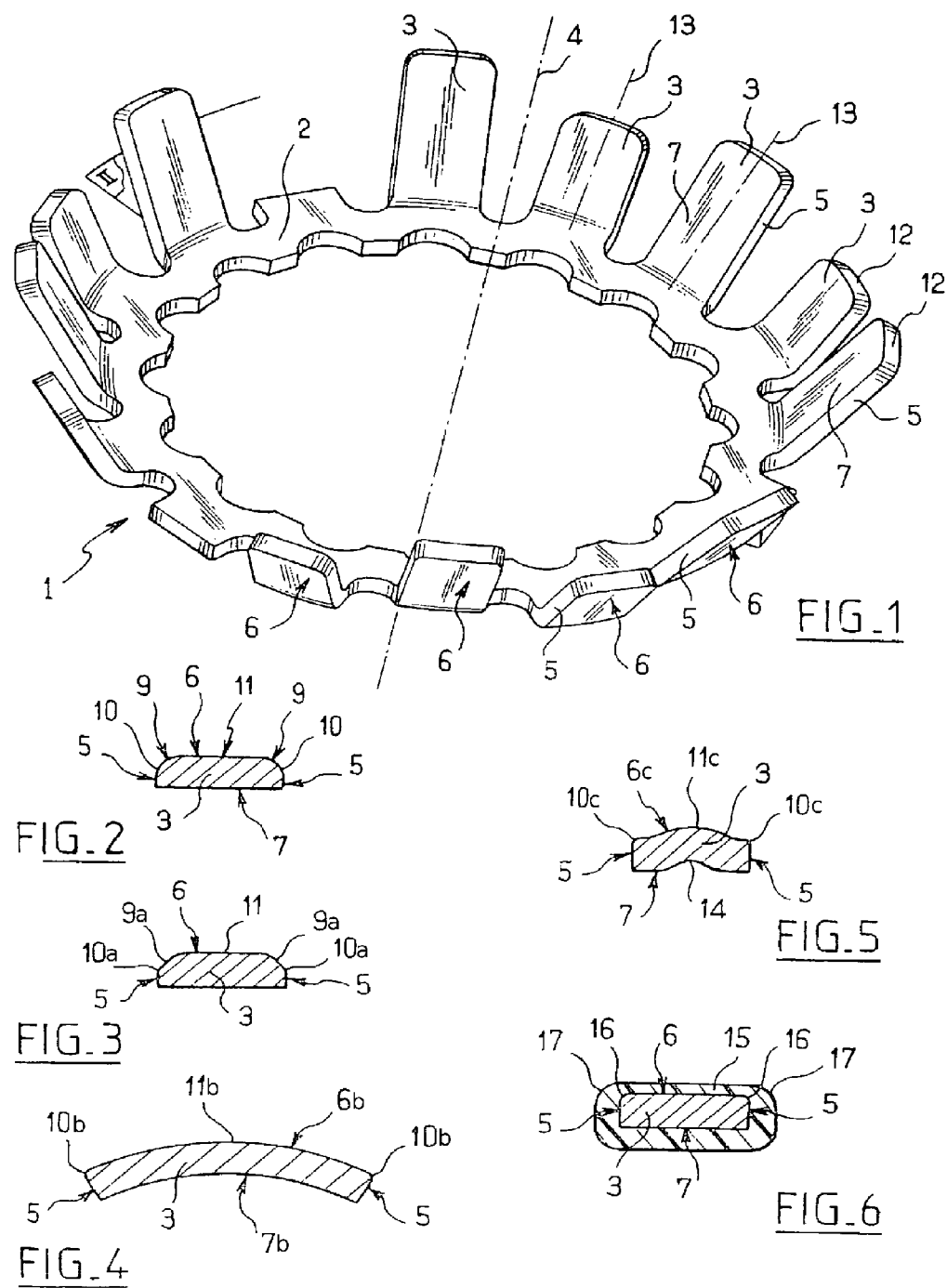

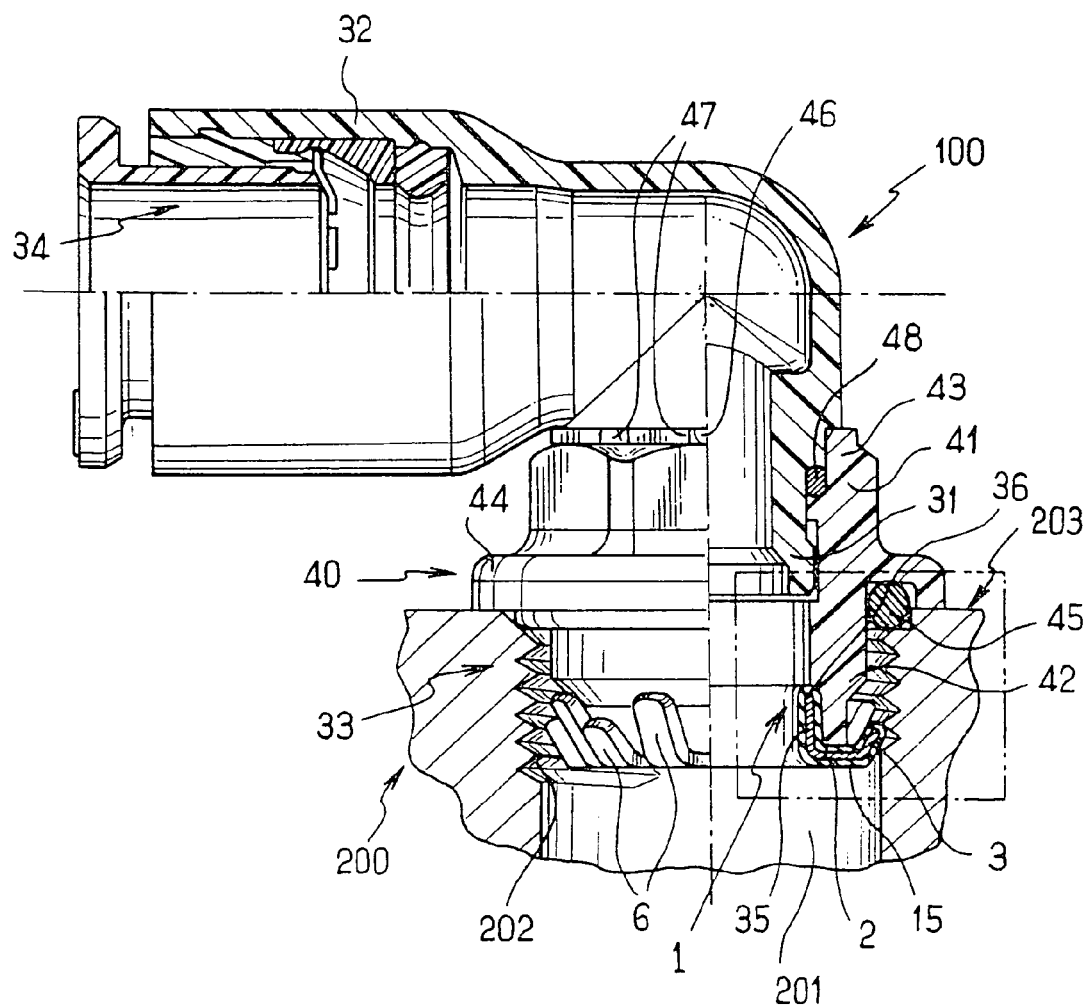
FIG_7

NON-AGGRESSIVE ANCHOR WASHER

The present invention relates to an anchor washer for anchoring a first element to a second element engaged relative thereto. By way of example, the first element is an end portion of a coupling device and the second element is constituted, for example, by a tapped end portion of a duct. The invention also provides a coupling device fitted with such a washer.

BACKGROUND OF THE INVENTION

The anchor washer generally comprises an annular portion from which there extend teeth that are inclined relative to a central axis of the annular portion. The annular portion is mounted on the end portion of the coupling device and each tooth has two side faces between which there extends a surface that faces towards the thread of the tapped end portion of the duct. The coupling device is installed by engaging the end portion of the coupling device in the tapping. The coupling device is retained by one or more teeth having free ends that bear against the flank of the thread, with the other teeth being held pushed back by the thread bearing against the teeth. Installation is fast and reliable.

Nevertheless, it has been found that the teeth of anchor washers subject the thread to wear or damage leading to particles or even shavings being detached therefrom (particularly if the wall of the duct is made of a plastics material) or else it files the thread down (if the wall of the duct is made of metal), thereby polluting the fluid that is transported and running the risk of damaging a circuit element connected downstream from the coupling device. Experiments have shown that this wear or damage results from the crest of the thread being bitten into by the side edges of the surfaces of the teeth that face towards the thread and that do not have their end surfaces bearing against the flank of the thread. This surface is a sliding surface that makes contact with the crest of the thread, and normally it ought to slide thereover. The side edges are formed by a right-angled connection between the sliding surface and the side faces. Since the anchor washer is obtained by being punched out, the side edges are either of a shape that is very slightly rounded as a result of metal being cut at the beginning of punching, or else they are in the form of a sharp cutting edge as a result of the metal tearing at the end of the punching operation (depending on whether the surface that faces towards the thread is the surface that faces the punch or that faces away from the punch). Even if the teeth are less aggressive in the first configuration, the wear they generate is nevertheless too great.

OBJECT OF THE INVENTION

An object of the invention is to provide anchor means presenting the advantages of known anchor washers while not having the above-identified drawback.

SUMMARY OF THE INVENTION

To this end, the invention provides an anchor washer for anchoring a first element and a second element in relative engagement, the washer comprising an annular portion from which there extends at least one tooth that is inclined relative to a central axis of the annular portion, the annular portion being designed for mounting on the first element, and the tooth having two side faces between which there extends a rubbing surface for being oriented substantially towards the second element, said surface being connected to the side faces via coupling portions, the tooth being shaped so that at least one of the coupling portions is set back from at least a portion of said surface so that the coupling portion is kept at a distance from the second element.

Thus, the coupling portion is not in contact with the second element so it does not penetrate into the second element and therefore generates neither wear nor damage thereon.

In various different embodiments:
said surface is chamfered in the vicinity of the coupling portion;
said surface has a portion that is convex in shape;
the tooth is curved about a longitudinal axis of the tooth;
the tooth includes a longitudinal fold forming the portion of convex shape; and
the tooth includes a covering layer.

These various embodiments make it simple to keep the coupling portion apart from the second element.

The invention also provides a coupling device comprising a tubular body having a first end and a second end for co-operating respectively with a first duct and with a second duct, the first end being arranged to be engaged in a tapped end portion of the first duct and being fitted with an anchor washer in the tapped end portion, the teeth of the washer extending outwards from the annular portion, the anchor washer presenting at least one of the above-specified characteristics.

Another object of the invention is to provide a coupling device comprising a tubular body having a first end and a second end for co-operating respectively with a first duct and a second duct, the first end being arranged to be engaged in a tapped end portion of the first duct and being fitted with an anchor washer having a covering layer extending over the annular portion, the tubular body and the covering layer of the annular portion being made of a plastics material and the annular portion of the anchor washer being secured to the tubular body by welding the covering layer to the tubular body.

Thus, the layer of plastics material serves firstly to secure the anchor washer to the tubular body, and secondly it ensures that contact between the tooth and the thread avoids machining the thread which might generate shavings that would run the risk of polluting the fluid being transported or the risk of damaging devices connected to the fluid transport circuit downstream from the coupling device.

Other characteristics and advantages of the invention appear on reading the following description of particular and non-limiting embodiments of the invention.

BRIEF DESCRIPTION OF THE DRAWINGS

Reference is made to the accompanying drawings, in which:

FIG. 1 is a diagrammatic perspective view of an anchor washer constituting a first embodiment of the invention;

FIG. 2 is a section view on plane II in FIG. 1, showing a tooth of the washer;

FIGS. 3 to 6 are views analogous to that of FIG. 2 showing a tooth respectively in second, third, fourth, and fifth embodiments;

FIG. 7 is a section view of a coupling device in a first embodiment fitted with a washer of the fifth embodiment.

DETAILED DESCRIPTION OF THE INVENTION

Figure 8:
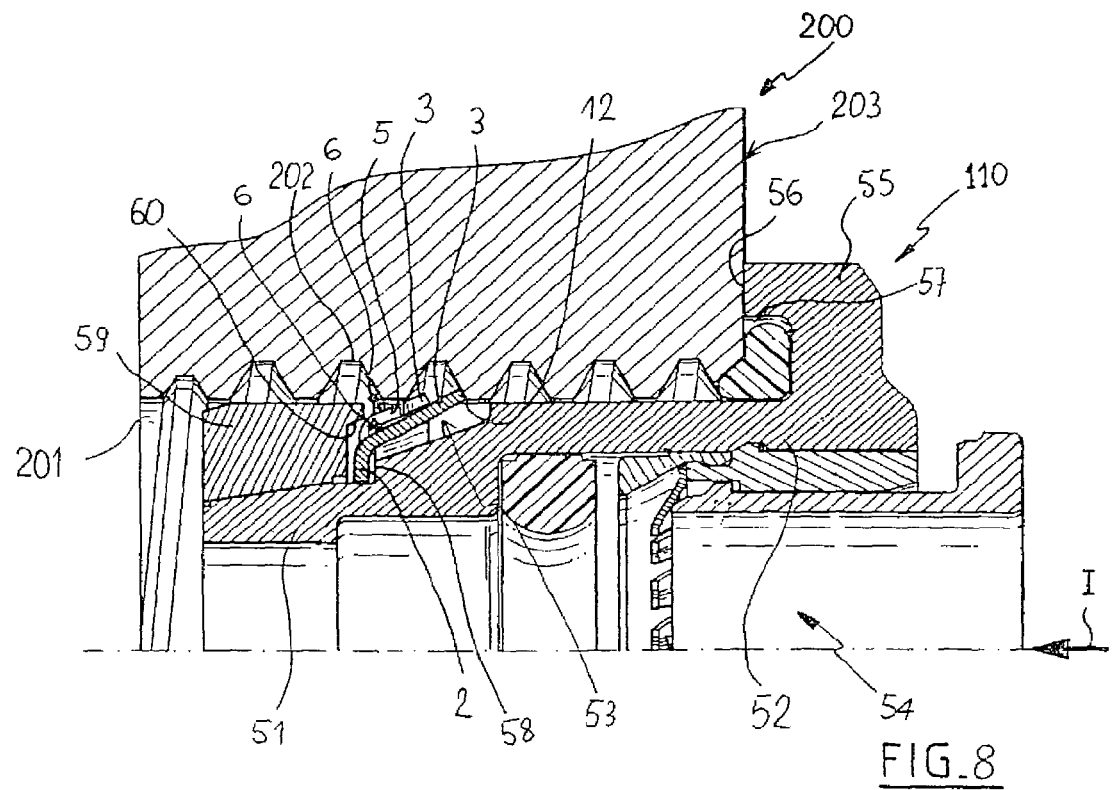
FIGS. 8 and 9 are views analogous to FIG. 7 of coupling devices in two other embodiments, fitted respectively with a washer of the first embodiment and with a washer of the fourth embodiment.

With reference to FIGS. 1 and 2, the anchor washer constituting the first embodiment of the invention, given overall reference 1, comprises an annular portion 2 having an outer circumference from which teeth 3 extend outwards. These teeth 3 are inclined relative to a central axis 4 of the annular portion 2. Each tooth 3 comprises two side faces 5 between which there extends a surface 6 (this surface is referred to below as the "sliding" surface 6) facing away from the central axis 4, and an opposite surface 7 facing the central axis 4. The sliding surface 6 has rounded end portions 9 connected to edges 10 connecting with the side faces 5 (the end portions 9 are not visible in FIG. 1). The edges 10 are thus set back from the central portion 11 of the sliding surface 6. Each tooth further comprises an end surface or terminal surface 12. The anchor washer 1 is made of metal, in this case of steel.

The anchor washer 1 is for fitting to a coupling device comprising a tubular body having a first connection section arranged to be inserted in a tapped end portion of a first duct, and a second connection section arranged to retain a second duct in leaktight manner. The annular portion 2 of the anchor washer 1 is, for example, received in conventional manner in a groove formed in the first connection section. The sliding surface 6 is for being oriented substantially towards the wall of the tapped end portion of the first duct.

Some of the teeth 3 have the end faces 12 of their free ends bearing against a flank of the thread, while other teeth have their sliding surfaces 6 bearing against the crest of the thread which pushes them back towards the central axis 4. The end faces 12 co-operate in friction with the flanks of the thread to oppose withdrawal of the coupling device. The end portions 9 hold the edges 10 at a distance from the thread. The edges 10 therefore cannot damage the thread of the first duct.

In order to further limit wear of the thread, the end face 12 of each tooth 3 can be arranged to be parallel with the flank of the thread when it bears thereagainst. The end face 12 may thus present an angle corresponding to the angle of the thread.

In a second embodiment shown in FIG. 3, the end portions 9a are shaped by chamfers. The edges 10a are thus set back from the central portion 11 of the sliding surface 6.

In a third embodiment shown in FIG. 4, the teeth 3 are curved about a longitudinal axis 13 of each tooth 3 so that the sliding surface 6b presents convex curvature and opposite surface 7b is concave. The edges 10b are thus set back from the central portion 11b of the sliding surface 6b.

In a fourth embodiment shown in FIG. 5, the teeth 3 have a respective longitudinal fold 14 such that the sliding surface 6c presents a central portion 11c in the form of a spline with its edges 10c set back.

In a fifth embodiment shown in FIG. 6, the teeth 3 are covered in a respective layer 15 of plastics material, in this case of polyamide. The extra thickness of the covering layer 15 serves to obtain rounded portions 17 of larger radius in register with the side edges 16 that are formed when the anchor washer 1 is punched out. The rounded portions 17 present little or no risk of damaging the thread. The covering layer also extends over the end face 12. The covering layer 15 may be obtained by electrostatic deposition or projection of plastics material in powder form onto the metal, followed by baking, by projecting non-polymerized resin on the metal and then polymerizing it, by dipping in a liquid plastics material, etc.

A coupling device adapted to the anchor washer 1 of the fifth embodiment is described below with reference to FIG. 7.

The coupling device is arranged to couple a pipe end (not shown in the figures) to a circuit element. The coupling device is arranged in such a manner as to be mounted on a circuit element, given overall reference 200, comprising a channel 201 with an end portion 202 that opens out in a surface 203 of the circuit element 200. The circuit element 200 may be a fluid emitter or receiver element, e.g. another pipe, a pump, a manifold, an actuator, a valve, . . .

The coupling device constituting the first embodiment of the invention comprises a tubular body given overall reference 100, and in this case presenting the shape of a right-angled bend. The tubular body 100 is made as a single piece of plastics material, such as a polyamide.

The tubular body 100 has a first end portion 31 provided with means given overall reference 33 for anchoring it in the end portion 202 of the channel 201, and a second end portion 32 provided with a housing for receiving the pipe end and means given overall reference 34 for retaining the pipe end therein in leaktight manner. The leaktight retention means 34 are constituted in this example by quick connection means of a kind that is in itself known (see for example French patent document FR-A-2 810 087) and they are therefore not described in detail herein. These retention means need not necessarily be quick connection means.

The anchor means 33 comprise a base given overall reference 40, for bearing against the surface 203 of the circuit element 200. The base 40 has a bushing 41 with a first end 42 for insertion into the end portion 202 of the channel 201, and a second end 43 for projecting therefrom.

The bushing 41 is provided on the outside, between its two ends 42 and 43, with a collar 44 having a bottom surface that is to bear against the surface 203 of the circuit element 200. The bottom surface of the collar 44 is provided with a plane groove receiving in conventional manner an annular sealing element 45 that is deformable.

The tubular body 100 is received in the bushing 41 of the base 40 so as to be capable of sliding between an operating position and a disassembly position. The tubular body 100 and the base 40 have complementary clutch means that are arranged in such a manner that they are separated from each other when the tubular body 100 is in its operating position (the tubular body 100 is then free to turn relative to the base 40), and that they co-operate with each other when the tubular body 100 is in the disassembly position (the tubular body 100 is then constrained in rotation with the base 40). These complementary clutch means are constituted in this example by axial projections 46 arranged on the tubular body 100 and axial setbacks 47 arranged in the end 43 of the bushing 41 of the base 40 so as to receive the axial projections 46 of the tubular body 100 when it is in the disassembly position.

An anchor washer 1 is secured to the end 42, which anchor washer 1 possesses an outer circumference that is subdivided into a plurality of teeth 3 arranged in such a manner that the anchor washer 1 is elastically deformable between an open state in which the anchor washer 1 has an outside diameter greater than the inside diameter of the end portion 202 of the channel 201 and a close state in which the anchor washer 1 has an outside diameter smaller than the inside diameter of the end portion 202 of the channel 201.

The annular portion 2 of the anchor washer 1 comprises a sleeve 35 received in the end 42 of the bushing 41. The anchor washer 1 and the sleeve 35 are both made of metal covered in the covering layer 15 of plastics material. The anchor washer 1 and the sleeve 35 may comprise a single part or they may be welded together. The sleeve 35 is connected to the end 42 of the bushing 41 by a weld 36 obtained by locally melting the covering layer 15 and the end wall 42. The welding is preferably performed by friction.

The coupling device is put into place by forcibly inserting the end portion 42 of the bushing 41 into the end portion 202 of the channel 201 until the base 40 comes into abutment against the surface 203. At least one of the teeth 3 of the anchor washer 1 is then spaced apart and received between two threads of the end portion 202.

Disassembly is performed by bringing the tubular body 100 in its disassembly position and then causing it to turn in such a manner as to unscrew the coupling device.

It should be observed that it is also possible during assembly to screw the coupling device in a little so as to press the base 40 firmly against the surface 203.

The sliding surfaces 6 of the teeth bearing against the crest of the thread slide thereover without the side edges of the sliding surface biting into the crest of the thread.

It should be observed that the deformable annular sealing element 48 is interposed between two shoulders, one of which belongs to the tubular body 100 and the other to the bushing 41. The sealing element 48 performs a resilient return function urging the tubular body 100 into its operating position. In addition, when the circuit in which the coupling device is installed is itself under pressure, the fluid under pressure pushes the tubular body 100 towards its operating position.

The coupling dispositions in two other embodiments are described below.

With reference to FIG. 8, the coupling device constituting a second embodiment is a quick coupling that comprises a rectilinear tubular body 110 having a first end 51 provided with means given overall reference 53 for anchoring it in the end portion 202 of the channel 201, and a second end portion 52 provided with a housing for receiving the pipe end and means, given overall reference 54, for retaining the pipe end therein in leaktight manner. The means 54 are known in themselves. As an indication, the second end 52 is provided with an open bore subdivided axially into three portions, namely, from right to left: a large diameter first portion for receiving an insert and an annular sealing gasket; a second portion of diameter that corresponds substantially to the outside diameter of the pipe to be inserted in the coupling; and a third portion of inside diameter substantially equal to the inside diameter of said pipe and that extends as far as the first end 51. The insert includes a groove that constitutes a housing for a retention washer provided internally with teeth for retaining the pipe that is to be inserted into the bore. A tubular pusher is mounted in the insert so as to be slidably movable in conventional manner between an inactive extended position in which the fastener washer is merely pressed against the tip of the pusher, and a retracted position in which the tip 35 lifts all of the retention washer 17.

In this example, the body 110 has a head 55 defining a radially-projecting shoulder 56 on the outside surface of the body 110 for defining an abutment against the coupling being put into the tapping 202. A circular groove 57 is provided in the shoulder 56 around the body 110 to receive the sealing gasket.

In this example, the anchor means 53 comprise an anchor washer 1 of the body 110 in the tapping, which is mounted in an outer groove 58 of the body 110 defined by a radial face of the body A and a face 60 of a bushing 59 which is mounted on the outer surface of the body 110. The bushing 59 may be bonded by adhesive or by a conical engagement. The anchor washer is of the first embodiment (FIG. 2). The face 60 is concave and frustoconical in shape. The concave frustoconical shape of the face 60 forms an abutment preventing the teeth of the anchor washer from folding over under the effect of an extraction force being exerted on the body 110.

Figure 9:
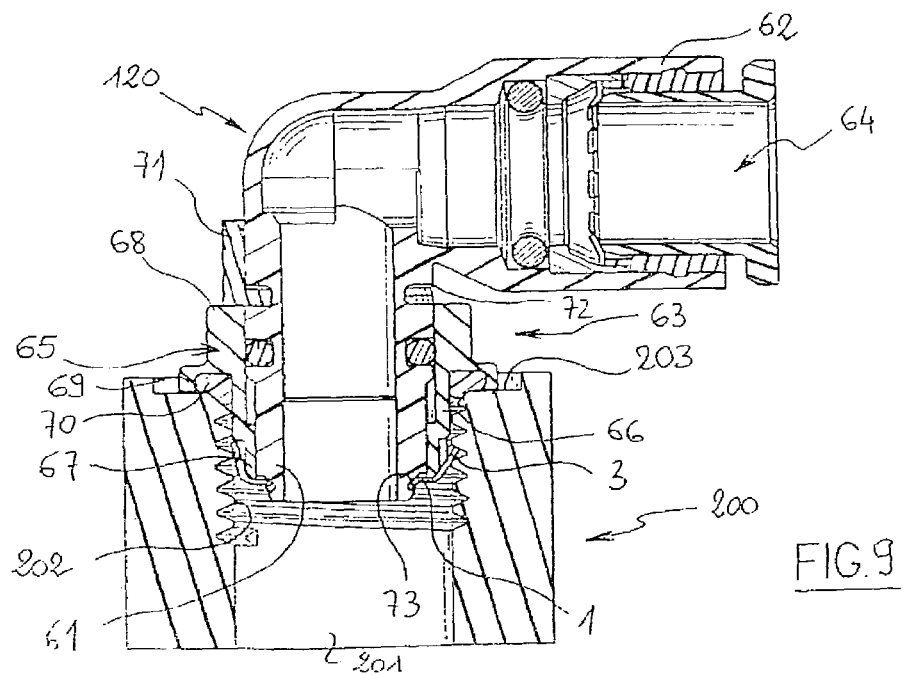

With reference to FIG. 9, the coupling device constituting the third embodiment of the invention comprises a tubular body given overall reference 120, and in this case in the form of a right-angled bend.

The tubular body 120 comprises a first end 61 provided with means given overall reference 63 for anchoring it in the end portion 202 of the channel 201, and a second end 62 provided with a housing for receiving the pipe end and means given overall reference 64 for retaining the pipe end therein in leaktight manner. The leaktight retention means 64 in this example are quick connection means of a type known in themselves (see for example French patent document FR-A-2 810 087), and they are therefore not described in detail herein. These retention means need not be quick connection means.

The anchor means 13 comprise an anchor washer 1 of the fourth embodiment together with a base given overall reference 65 bearing against the surface 203 of the circuit element 200.

The anchor washer 1 possesses an outer circumference subdivided into a plurality of teeth arranged in such a manner that the anchor washer 1 is elastically deformable between an open state in which the anchor washer 1 has an outside diameter greater than the inside diameter of the end of the channel 201, and a closed state in which the anchor washer 1 has an outer diameter smaller than the inside diameter of the end of the channel 202.

At rest, the anchor washer 1 is in its open state.

The anchor washer 1 is received in an outer groove 73 in the end 61 of the tubular body 120.

The base 65 has a bushing 66 with a first end 67 for inserting into the end of the channel, and a second end 68 that is for projecting out therefrom.

The bushing 66 is provided on the outside, between its two ends 67 and 68, with a collar 69 having a bottom surface that is to bear against the surface 203 of the circuit element 200. The bottom surface of the collar 69 is provided with a plane groove that receives in conventional manner an annular and deformable sealing element 70.

The tubular body 120 is received in the bushing 66 of the base 65 so as to be slidable between an operating position and a disassembly position which are described in greater detail below for each of the embodiments.

When the tubular body 120 is in its operating position, the teeth of the anchor washer 1 bear against the end 67 of the bushing 66 that constitutes an axial abutment for the teeth 18 and that holds the anchor washer 1 in its open state.

When the tubular body 120 is in its disassembly position, the teeth of the anchor washer 1 escapes from bearing against the end 67 of the bushing 66, and the anchor washer 1 is in its closed state.

The coupling device has retaining means for retaining the tubular body 120 in its operating position. These means comprise a resilient split ring 71 removably received in a groove 72 formed in the outside of the tubular body 120 so that in the operating position, the resilient split ring 71 projects from the tubular body and bears axially against the end 68 of the base 65 so as to oppose the tubular body 120 being pushed towards its disassembly position.

The coupling device is put into place on the circuit element 200 by being pushed in, and optionally by screw fastening. By way of example, the anchor washer 1 is prevented from turning relative to the body 120 by adhesive, by a lug secured to the washer engaging in a housing in the body 120, or by some of the teeth of the washer being received between axial splines of the body.

In order to extract the tubular body 120, the resilient split ring 71 is removed prior to the tubular body 120 being pushed into its disassembly position.

During this pushing-in movement, the teeth of the anchor washer 1 cease bearing against the end 67 of the bushing 66 so that the teeth return elastically into their rest position: the anchor washer 1 is then in its closed state. It is then possible to exert a traction force on the portion of the tubular body 120 that is projecting from the end of the channel 202 in order to extract the coupling device from the end of the channel 202. The anchor washer 1 provides axial retention of the tubular body 120 relative to the base 65, the teeth of the anchor washer 1 being in the closed state also entraining the base 65 by bearing against the end 67 (in the absence of resistance to extraction, the extraction force is not sufficient to deform the teeth and bring the anchor washer 1 into its open state).

Naturally, the invention is not limited to the embodiment described and it covers any variant coming within the ambit of the invention as defined by the claims.

In particular, the covering layer may be localized in locations where the teeth run the risk of damaging the thread.

The anchor washer may also be welded to a portion that is stationary relative to the end 31 of the tubular body, or it may be welded directly to the tubular body.

The tubular body may be of a shape other than that shown, and in particular it may be straight in shape.

The washer may also be releasably fitted on the tubular body 100.

Each of the anchor washers in accordance with the invention is suitable for use with various types of coupling device. The anchor washers described are thus all suitable for use with all of the coupling devices described.

Furthermore, the invention applies to inserting coupling devices into housings other than tapped housings, and for example into bores that are provided with one or more grooves or ribs projecting into the bore . . . . The fact of the side edges of the sliding surface being set back therefrom continues to be advantageous since this configuration prevents the side edges from inflicting wear on sharp edges present within the bore.

What is claimed is:

1. A coupling device, comprising:
    a tubular body having a first end and a second end configured to co-operate, respectively, with a first duct and a second duct, the first end configured to engage a threaded portion within an end portion of the first duct; and
    an anchor washer, configured to be fitted within the end portion of the first duct, the anchor washer comprising a planar annular portion surrounding a central axis and configured to be received in a groove on the first end of the tubular body,
    the anchor washer further comprising at least one tooth extending from the annular portion, the at least one tooth having an inner radial face, an outer radial face, two side surfaces, and two coupling surfaces,
    wherein the outer radial face is a sliding surface facing away from the central axis, the sliding surface extending continuously between a topmost and a bottommost portion of the tooth, the sliding surface further continuously extending from a first coupling surface connected to a first of the two side faces and a second coupling surface connected to a second of the two side faces,
    wherein the at least one tooth is inclined relative to the central axis such that the tooth is oriented outwardly from a center of the annular portion,
    wherein the at least one tooth is shaped such that at least one of the coupling surfaces is distanced from the sliding surface such that the at least one of the coupling portions is configured to be maintained at a distance from the wall of the first duct when the tubular body, with the anchor washer received in the groove, is inserted into the threaded end portion of the first duct, and
    wherein the coupling surfaces are selected from the group consisting of i) chamfered surfaces, ii) convex shaped surfaces, and iii) rounded surfaces, to prevent the at least one tooth damaging the threaded surface within the end portion of the first duct.

2. The coupling device according to claim 1, wherein the at least one tooth includes a covering layer.

3. The coupling device according to claim 2, wherein the covering layer is a plastic material.

4. The coupling device according to claim 1,
    wherein the annular portion has a covering layer,
    wherein the tubular body and the covering layer of the annular portion are made of plastic material, and
    wherein the annular portion of the anchor washer is secured to the tubular body by welding the covering layer to the tubular body.

* * * * *